United States Patent
Archer et al.

(10) Patent No.: US 7,529,963 B2
(45) Date of Patent: May 5, 2009

(54) CELL BOUNDARY FAULT DETECTION SYSTEM

(75) Inventors: Charles Jens Archer, Rochester, MN (US); Kurt Walter Pinnow, Rochester, MN (US); Joseph D. Ratterman, Rochester, MN (US); Brian Edward Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 440 days.

(21) Appl. No.: 11/052,659

(22) Filed: Feb. 7, 2005

(65) Prior Publication Data

US 2006/0179361 A1    Aug. 10, 2006

(51) Int. Cl.
*G06F 11/00* (2006.01)

(52) U.S. Cl. .............................. 714/4; 709/223; 709/224
(58) Field of Classification Search ....................... 714/4
See application file for complete search history.

(56) References Cited

U.S. PATENT DOCUMENTS

| | | | |
|---|---|---|---|
| 4,320,508 A | | 3/1982 | Takezoe |
| 5,230,047 A | * | 7/1993 | Frey et al. ....................... 714/4 |
| 5,325,518 A | | 6/1994 | Bianchini, Jr. |
| 5,537,653 A | | 7/1996 | Bianchini, Jr. |
| 5,561,769 A | | 10/1996 | Kumar et al. |
| 5,684,807 A | * | 11/1997 | Bianchini et al. ........... 714/712 |
| 5,920,267 A | | 7/1999 | Tattersall et al. |
| 6,108,796 A | | 8/2000 | Lasken |
| 6,714,552 B1 | | 3/2004 | Cotter |
| 6,880,100 B2 | | 4/2005 | Mora et al. |
| 7,058,848 B2 | | 6/2006 | Sicola et al. |
| 7,139,925 B2 | | 11/2006 | Dinker et al. |
| 7,149,920 B2 | | 12/2006 | Blumrich et al. |
| 2001/0052084 A1 | | 12/2001 | Huang et al. |
| 2002/0133756 A1 | | 9/2002 | Jain |
| 2003/0023893 A1 | * | 1/2003 | Lee et al. ........................ 714/4 |
| 2003/0198251 A1 | | 10/2003 | Black et al. |
| 2005/0198097 A1 | | 9/2005 | Kalnitsky |
| 2005/0246569 A1 | * | 11/2005 | Ballew et al. .................. 714/4 |
| 2006/0117212 A1 | | 6/2006 | Meyer et al. |

OTHER PUBLICATIONS

Park et al. 'Fault-Tolerant Broadcasting in Wormhole-Routed Torus Networks'. 2002. IEEE computer society.*
Azeez et al. 'I/O Node Placement For Performance and Reliability in Torus Networks'.*
Almasi et al. Optimization of MPI Collective Communication on Bluegene/L Systems. Jun. 2005. ACM.*

* cited by examiner

*Primary Examiner*—Yolanda L Wilson
(74) *Attorney, Agent, or Firm*—Wood, Herron & Evans, LLP

(57) ABSTRACT

A method determines a nodal fault along the boundary, or face, of a computing cell. Nodes on adjacent cell boundaries communicate with each other, and the communications are analyzed to determine if a node or connection is faulty.

13 Claims, 4 Drawing Sheets

CELL BOUNDARY FAULT DETECTION SYSTEM

This invention was made with Government support under Contract No. B519700 awarded by the Department of Energy. The Government has certain rights in this invention.

CROSS-REFERENCE TO RELATED APPLICATIONS

This application is related to the following U.S. Patent Applications all filed on even date herewith by Charles Jens Archer et al.: Ser. No. 11/052,658, entitled "ALL-TO-ALL SEQUENCED FAULT DETECTION SYSTEM," Ser. No. 11/052,660, entitled "ROW FAULT DETECTION SYSTEM," Ser. No. 11/052,661, entitled "MULTI-DIRECTIONAL FAULT DETECTION SYSTEM," Ser. No. 11/052,663, entitled "BISECTIONAL FAULT DETECTION SYSTEM," and Ser. No. 11/052,662, entitled "ALL ROW, PLANAR FAULT DETECTION SYSTEM,". The present application is also related to U.S. Patent Application filed on even date herewith by John A. Gunnels et al., Ser. No. 11/050,945, entitled "SYSTEM AND METHOD FOR DETECTING A FAULTY OBJECT IN A SYSTEM,". Each of these applications is incorporated by reference herein.

FIELD OF THE INVENTION

The invention is generally directed to parallel processing computer systems, and in particular, to fault detection in parallel processing computer systems.

BACKGROUND OF THE INVENTION

Parallel processing computer systems have found application in a number of different computing scenarios, particularly those requiring high performance and fault tolerance. For instance, airlines rely on parallel processing to process customer information, forecast demand and decide what fares to charge. The medical community uses parallel processing supercomputers to analyze magnetic resonance images and to study models of bone implant systems. A parallel processing architecture generally allows several processors having their own memory to work simultaneously. Parallel computing systems thus enable networked processing resources, or nodes, to cooperatively perform computer tasks.

The best candidates for parallel processing typically include projects that require many different computations. Unlike single processor computers that perform computations sequentially, parallel processing systems can perform several computations at once, drastically reducing the time it takes to complete a project. Overall performance is increased because multiple nodes can handle a larger number of tasks in parallel than could a single computer.

Other advantageous features of some parallel processing systems regard their scalable, or modular nature. This modular characteristic allows system designers to add or subtract nodes from a system according to specific operating requirements of a user. Parallel processing systems may further utilize load balancing to fairly distribute work among nodes, preventing individual nodes from becoming overloaded, and maximizing overall system performance. In this manner, a task that might otherwise take several days on a single processing machine can be completed in minutes.

In addition to providing superior processing capabilities, parallel processing computers allow an improved level of redundancy, or fault tolerance. Should any one node in a parallel processing system fail, the operations previously performed by that node may be handled by other nodes in the system. Tasks may thus be accomplished irrespective of particular node failures that could otherwise cause a failure in non-parallel processing environments.

Despite the improved fault tolerance afforded by parallel computing systems, however, faulty nodes can hinder performance in the aggregate. It consequently becomes necessary to eventually replace or otherwise fix underperforming nodes and/or associated connections. For instance, it may be advantageous to check for faulty cables, software, processors, memory and interconnections as modular computing components are added to a parallel computing system. Connections along the outer connecting surfaces of node cells are particularly prone to damage, improper installation and/or routing. As a result of being physically cabled (as opposed to the factory construction of the cell internal wiring), the cell surface connections are much more susceptible to cable damage, human error in cabling, and configuration issues that may result in a nonfunctional system.

The relatively large number of nodes used in some such systems, however, can complicate node maintenance. Ironically, the very redundancy that enables fault tolerance can sometimes challenge processes used to find faulty nodes along a node cell surface, or face. With so many nodes and alternative data paths, it may be difficult to pinpoint the address or even the general surface of a node cell or nodal connection requiring service.

As such, a significant need exists for a more effective way of determining and locating faulty nodes in a parallel processing environment.

SUMMARY OF THE INVENTION

The invention addresses these and other problems associated with the prior art by providing a method of detecting a nodal fault along a cell boundary. The cell may comprise part of a computing system having a plurality of nodes, at least one of which comprises part of a first boundary surface of a the cell. The node on the first boundary surface may be configured to connect to a second node on a second boundary surface. For instance, the second boundary surface may be part of another or the same cell. Other adjacent nodes on the respective boundaries may concurrently communicate, as well. As such, the first node on the first boundary surface may be made to communicate with the second node on a second boundary surface. The communication between the nodes may be used to determine the nodal fault. Typical nodal faults relate to hardware and software components, including cabling.

To determine nodal faults, aspects of the invention may determine if the first node is located on the first boundary surface, as well as if the second node is adjacent to the first node. Should the second node not be adjacent, for instance, then an error may be signaled. Information regarding the nodal fault may be stored and used to initiate servicing of the faulty component. The communications between the nodes may be checked for conformance with latency and bandwidth specifications.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
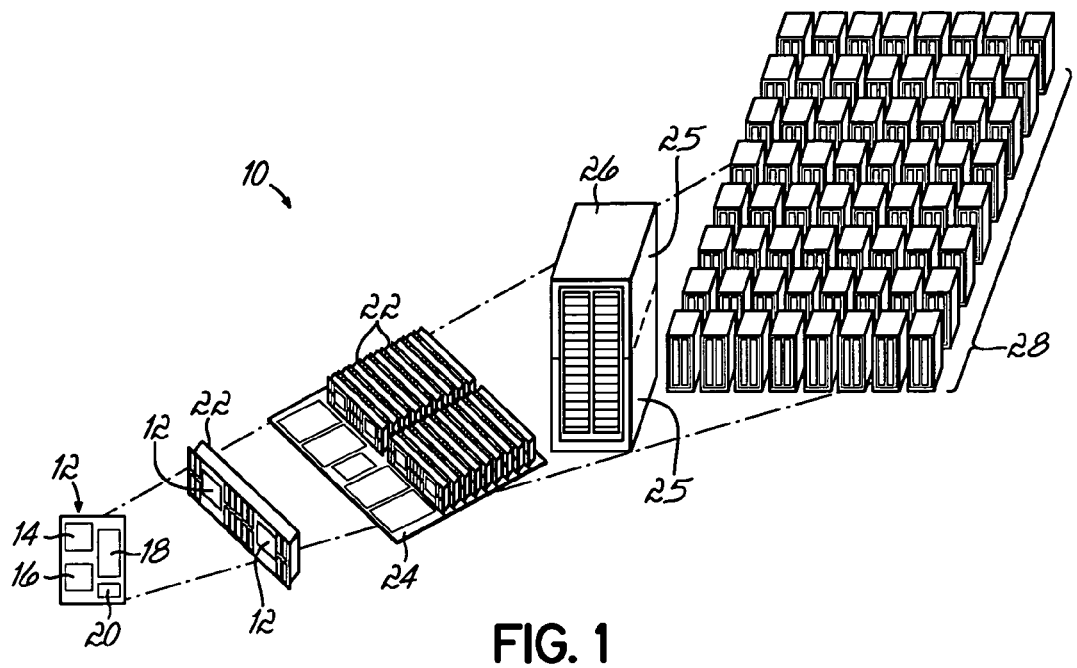
FIG. 1 is a block diagram that includes components of a parallel processing system configured to detect nodal faults using a scalable algorithm that sequentially sends packets between nodes of adjacent node cell surfaces.

Parallel computing systems, such as the BlueGene/L system created by International Business Machines, often include a node cellular architecture. As discuss below in detail, the BlueGene/L system is built from blocks of node midplanes that may be connected through several inter and intra midplane networks. The system may be constructed incrementally, with midplane cells being added to build the larger, final system. As each midplane is added to the system, the hardware and system software must be tested for faulty configurations, including interconnect, processing, memory and software control.

The primary point to point message passing network for BlueGene/L is a three dimensional torus network, where every node is connected to six other nodes in a mesh, forming a cube of (x,y,z) nodes. For example, a 512 node midplane torus consists of an 8×8×8 node arrangement. Torus implies that the nodes on the face of the cube wrap around to connect to nodes on the opposite face. This torus network can be extended in all three directions by connecting the faces of these logical cubes via link chips, which are essentially switches between midplanes. The link chips are connected via cables, while the internal torus is connected via circuitry within the midplane.

The torus network and cellular characteristic of the system permit dynamic rerouting around problematic nodes and links, or nodal faults. However, increased communication costs are incurred each time a rerouted communication must travel through a different level of organization, e.g., node, midplane, etc. For instance, it may take more time for a data packet to be routed over to an adjacent cell than would it to another node in the same cell. This may be because the data packet would have to travel over additional cabling that connects to respective faces of adjacent cells, requiring relatively more travel and processing time. It is consequently desirable to promptly detect and service nodal faults in order to minimize associated boundary changes and rerouting. Unfortunately, the very redundancy designed into the system complicates conventional processes used to find nodal faults. With so many nodes and alternative data paths, pinpointing the location of a node or nodal connection requiring service may be problematic.

To address this need, the present invention capitalizes on features of the system to detect faulty torus links, miscabled midplanes, and bad hardware in general. For instance, compute Application Specific Integrated Circuits (ASIC's) of the BlueGene/L include error detection registers. An error detection register may, for instance, register the number of torus retransmits for each direction. Aspects of the invention may use this data to help pinpoint hardware failures after tests are run. The BlueGene/L compute ASIC will also deliver interrupts to the operating system if the hardware is put into an exceptional state. These two features thus provide a basis for internal (via software) and external (via the control system or system monitoring facilities) fault detection capability.

The processes of the present invention may include first booting the system via a control system. The program code loads may take place using a control network that is completely independent of the torus. Once the program code is loaded on the system and the hardware is initialized, the tests consistent with the invention may be run. After the tests complete, data collection may be performed either via the external hardware interfaces, or through the software interfaces.

Aspects of the invention include a system configured to detect nodal faults along a face, or surface, of a nodal cell structure. To check errors on this unique surface topology, aspects of the invention include a test that can perform face checking.

Every logical 512 way midplane, or other cell-type, is connected to another midplane via its face. For example, a midplane face is connected to another midplane's face. The torus network includes a feature that if a packet is routed through a node that is not on the logical path of the packet, an exception will be thrown. For example, assume a packet is supposed to be sent from coordinates (0,0,0) to coordinate (3,0,0), and the system is configured to deliver packets via the shortest path. If a packet is sent the wrong way (via 7,0,0 on a 8×8×8 torus), then node (7,0,0) will throw an exception to the operating system that a packet has been misrouted.

An embodiment consistent with the invention capitalizes on this feature to use a face checking diagnostic. Two nodes on adjacent faces on a 16×8×8 Torus network have (without loss of generality) coordinates (7,0,0) and (8,0,0). Every node in the system except (7,0,0) waits for packet reception, and node (7,0,0) may become the sender and send a packet explicitly to (8,0,0). If the packet has successfully crossed the cable and link chip boundary, the cable may be verified for functionality. If the packet has not been delivered to (8,0,0), then another node will receive the packet and the location of this node may be easily determined by the hardware identifier. The miscabled or misconfigured hardware may then be corrected. Bandwidth and latency may also be checked across link chips and cables, and hardware retransmit counters may be verified to measure link integrity.

Turning to the Drawings, wherein like numbers may denote like parts throughout several views, FIG. 1 shows components 12, 22, 24, 26 of a parallel processing system 28 configured to detect nodal faults using a scalable algorithm that may send packets from one face node to another. FIG. 1 more particularly shows a parallel computing system 28, or apparatus, such as the BlueGene/L system created by International Business Machines. The system 28 comprises a highly scalable, cellular architecture that can be replicated in a regular pattern, with no introduction of bottlenecks as the system is scaled up.

The parallel processing system 28 fundamentally includes a plurality of nodes 12. Each node 12 typically comprises two Application Specific Integrated Circuits (ASIC's) 14, 16, a local cache memory 18 and an Input/Output (I/O) interface 20. ASIC's 14, 16 share external memory 29 located on a card 22, onto which two nodes 12 mount. Sixteen cards 22 are typically placed on a node board 24. Sixteen node boards 24 comprise a midplane, or cell 25, two of which may be positioned inside a cabinet 26 for a total of 1024 nodes, or 512 nodes per cell. The system 28 includes sixty-four cabinets and over sixty-five thousand nodes.

The nodes 12 may be interconnected through multiple, complementary highspeed and low latency networks. The networks typically include a three-dimensional torus network that wraps around the edges, and a combining tree network for fast global operations. The torus network includes point-to-point, serial links between routers embedded within the system ASIC's. As such, each ASIC has six nearest-neighbor connections, some of which may traverse relatively long cables.

Though not shown, the system 28 may include a front end, host computer used for compiling, diagnostics and/or analysis. An I/O node of the system 28 may handle communication between a compute node and other systems, including the host and file servers. The choice of host may depend on the class of applications, as well as their bandwidth and performance requirements.

Figure 2:
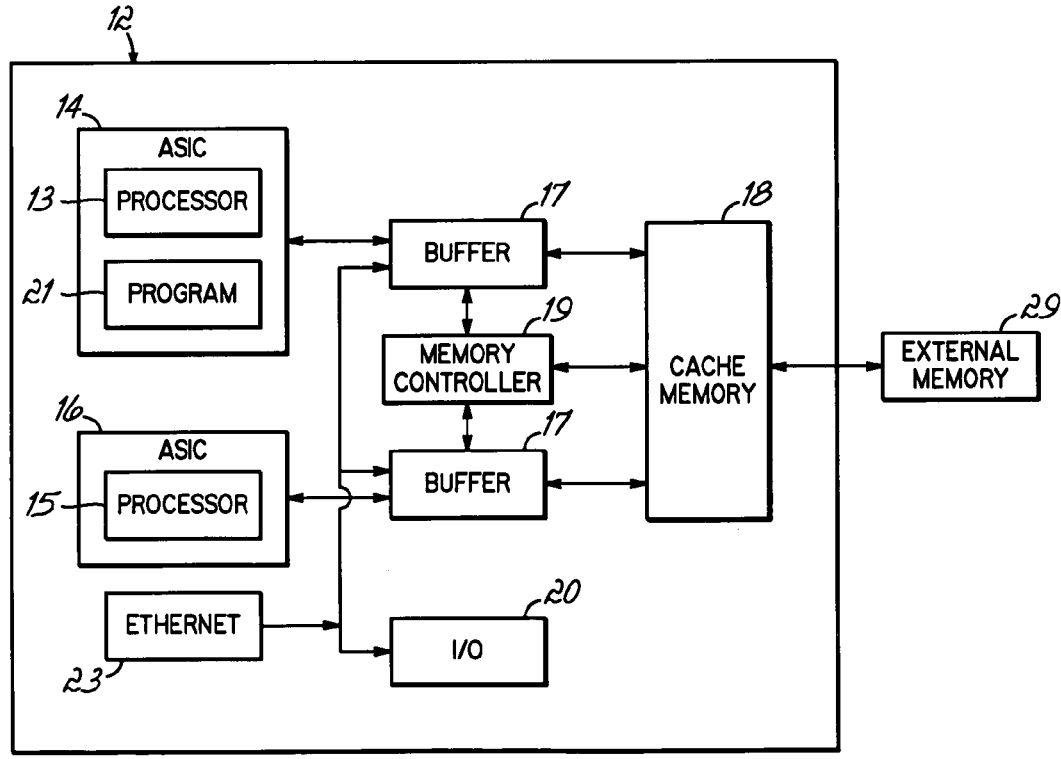
FIG. 2 is a block diagram of a node of the parallel processing system of FIG. 1.

FIG. 2 is a block diagram of a node 12 of the parallel processing system 28 of FIG. 1. The BlueGene/L node 12 includes a compute ASIC 14 comprising necessary network interfaces and on-chip memory. An on-chip memory controller 19 provides access to cache memory 18, such as Synchronous Dynamic Random Access Memory (SDRAM) memory chips.

In addition to the compute ASIC 14, each node 12 may include a link ASIC 16 for messaging. When crossing a cell boundary, network interrupt signals pass through the link ASIC 16. This link ASIC 16 re-drives signals over cables between cells and redirects signals between its different ports. These design features allow improved signal quality and less traffic interference. These features also enable additional cells to be cabled as spares to the system and used, as needed, upon failures. Each of the partitions formed through this manner has its own torus, tree and barrier networks that are isolated from all traffic from all other partitions.

Processors 13, 15 of the respective ASIC's 14, 16 thus communicate with the memory 18, memory controller 18 and associated buffers 17. Furthermore, one or more of the processors 13, 15 may couple to a number of external devices, including an input/output interface 20, memory 29, a workstation controller (not shown) and an Ethernet interface 23.

One skilled in the art will appreciate that any number of alternate computer architectures may be used in the alternative. That is, while the node 12 of FIG. 2 comprises a specific hardware implementation having particular application within the context of an embodiment consistent with the invention, it is not intended to limit the scope of the invention. It should consequently be appreciated that the invention may be implemented in other computers and data processing systems, e.g., in single or multi-user computers such as workstations, desktop computers, portable computers, server computers and the like, or in other programmable electronic devices (e.g., incorporating embedded controllers and the like). That is, the number of card, processors, slots, etc., and network configurations may change according to application specifications.

The discussion hereinafter will focus on the specific routines utilized to implement the above-described system 28. The routines executed to implement the embodiments of the invention, whether implemented as part of an operating system or a specific application, component, program, object, module or sequence of instructions executed by node or other processors, will also be referred to herein as "computer program code," or simply "program code." The computer program code typically comprises one or more instructions that are resident at various times in various memory and storage devices in a computer, and that, when read and executed by one or more nodal or other processors of a computer system, cause that system to perform the steps necessary to execute steps or elements embodying the various aspects of the invention. For instance, program 21 may enable face checking of cell surface for nodal faults. "Nodal" for purpose of this specification may refer to the hardware or software relating to a node, including a connection associated with a node.

Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to recordable type media such as volatile and nonvolatile memory devices, floppy and other removable disks, hard disk drives, optical disks (e.g., CD-ROM's, DVD's, etc.), among others, and transmission type media such as digital and analog communication links.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Figure 3:
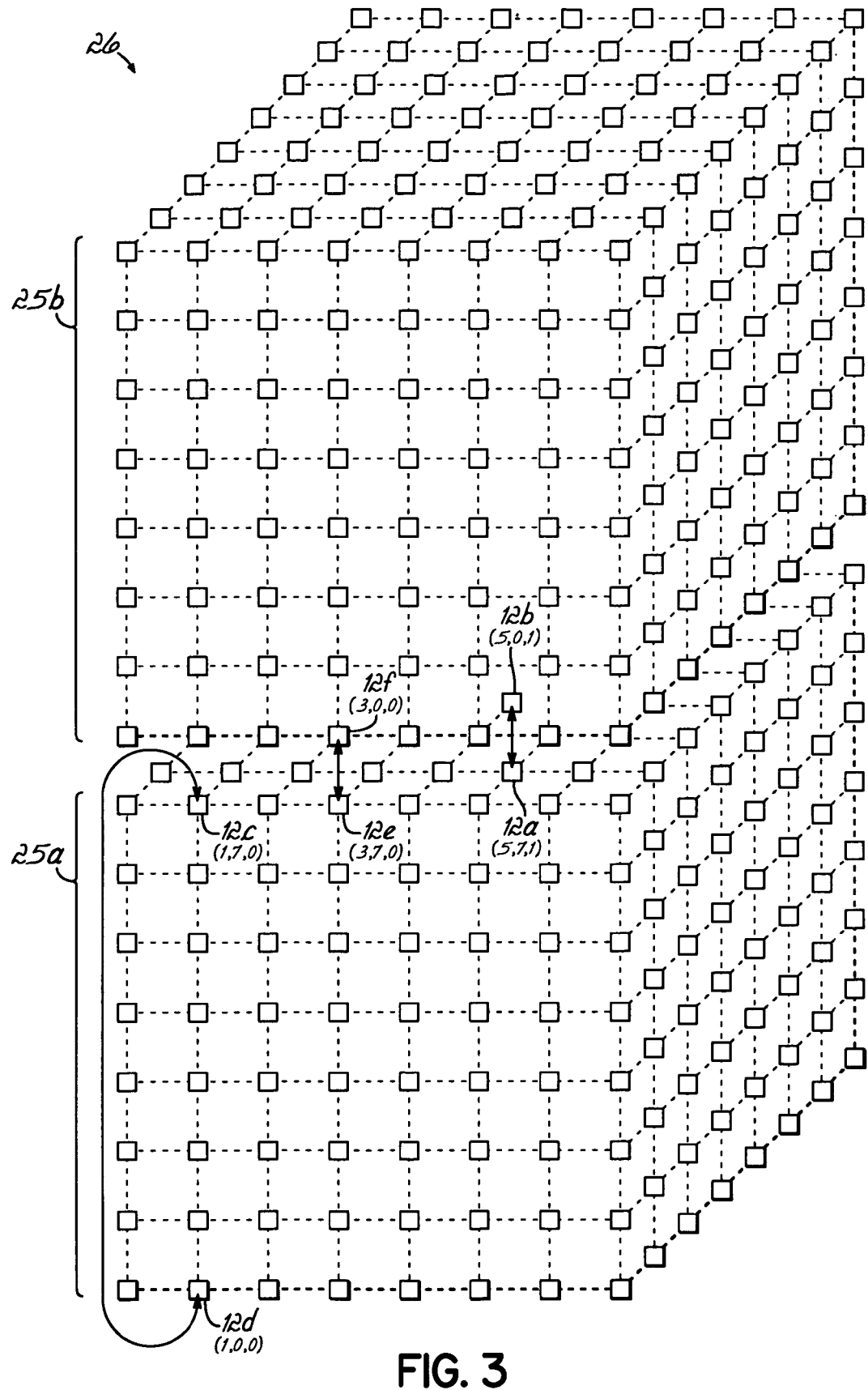
FIG. 3 is a block diagram of two connected cells of the parallel processing system of FIG. 1.

FIG. 3 is a block diagram of two connected cells 25*a*, 25*b* of the parallel processing system 28 of FIG. 1. The cells 25*a*, 25*b* are shown connected in a manner consistent with the cabinet 26 shown in FIG. 1. As such, each cell 25*a*, 25*b* includes an eight-by-eight-by-eight structure of 512 interconnected computing nodes. In the context of the present invention, the cells 25*a*, 25*b* connect at adjacent nodes located along their respective adjacent surfaces.

During a face checking operation for faulty surface nodes, a node 12*a* having coordinates (5, 7, 1) of the first cell 25*a* may send a packet to an adjacent surface node 12*b* having coordinates (5, 0, 1) of the second cell 25*b*. The node 12*b* will ideally send back a confirmation signal indicating that the communication between the nodes 12*a*, 12*b* (and cells 25*a*, 25*b*) was completed. The communication may further be checked to see if it satisfied latency and bandwidth requirements. Where such performance conditions were unmet, or the confirmation signal was not received, an error may be logged to apprize a user of a potentially faulty nodal connection along a cell surface.

As shown in FIG. 3, node 12*e* of cell 25*a* may similarly communicate with adjacent node 12*f* of cell 25*b* to verify nodal connectivity. The network topology of the cell structure may further allow nodes 12*c* and 12*d*, which are located at opposite surface of the same cell 25*a*, to accomplish a handshake node verification. While such communications between facial nodes may be accomplished sequentially, the tests typically occur concurrently, and may be continuously or periodically repeated. A testing sequence of another embodiment consistent with the invention may occur in response to an occurrence, such as user input or the addition of a new cell to the system 28.

Those skilled in the art will recognize that the exemplary environments illustrated in FIGS. 1-3 are not intended to limit the present invention. While the nodes 12 of FIGS. 1-3 are shown connected in a modular fashion, any combination of local area networks (LAN's), wide area networks (WAN's) and/or other networking topologies known in the art may alternatively be used to network computing processors comprising nodes. Individual nodes may thus not be physically located in close proximity with other nodes, i.e., be geographically separated from other nodes as is well known in the art. Moreover, a wide variety of interconnection types, network types, member types, etc., may be permitted to coexist with one another in an efficient and reliable manner in parallel computing system. Indeed, those skilled in the art will recognize that other alternative hardware and/or software environments may be used without departing from the scope of the invention.

Figure 4:
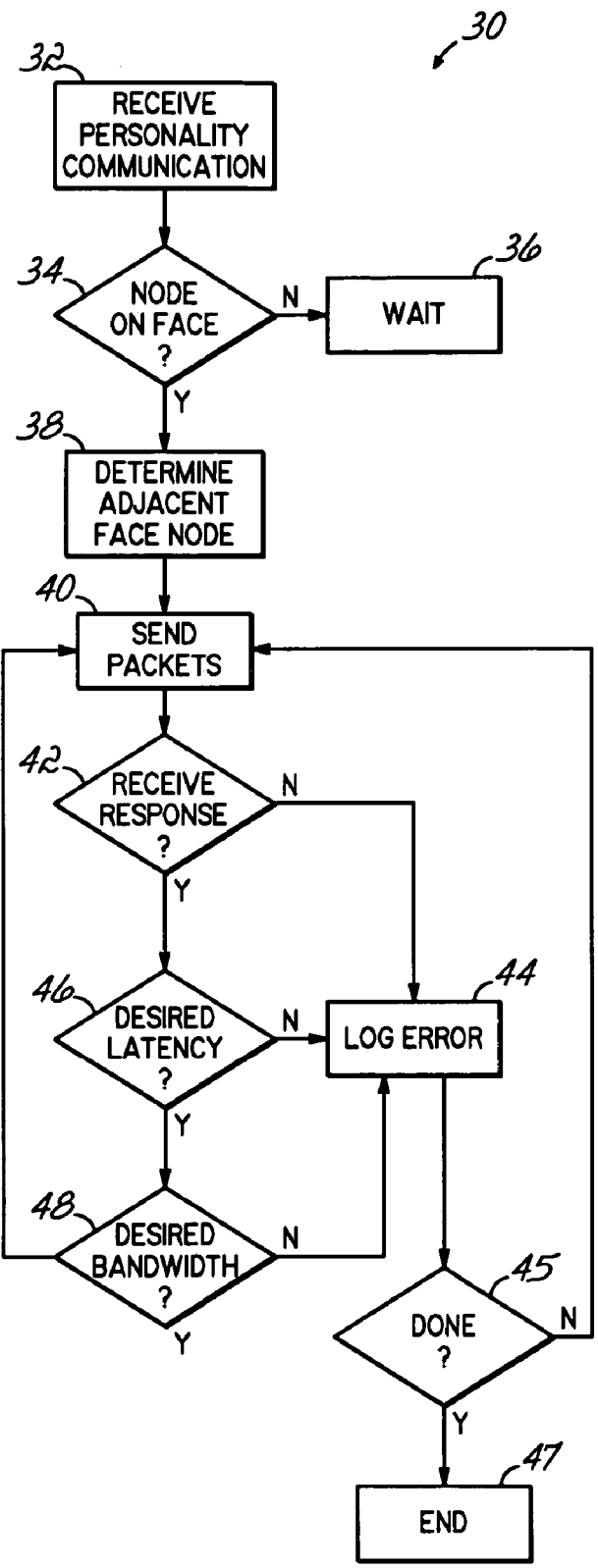
FIG. 4 is a flowchart having a set of exemplary steps executable by the system of FIG. 1 for conducting a cell surface node integrity check from the perspective of a transmitting node positioned along a surface of a cell of FIG. 3.

FIG. 4 is a flowchart 30 having a set of exemplary steps executable by the system 28 of FIG. 1 for conducting a cell surface node integrity check from the perspective of a transmitting node 12a positioned along a surface of a cell 25a of FIG. 3. At block 32 of FIG. 4, the surface node 12a may receive a personality communication. The personality communication may comprise a message sent from the control system to each node during startup. The personality communication further includes information used by the ASIC's 14, 16 of each node 12. Such information may include the coordinates of the receiving node, as well as the size of cell 25 and/or system 28.

As such, the surface node 12a may determine at block 34 if it is located along an outer surface, or face, of its cell 25a. Such may be the case where, for instance, the ASIC 14 executing the program 21 determines that one of the coordinates of the node 12a is "0." If not, then the node should not be checked and may have to wait at block 36 for another type of test. Where the node 12a alternatively resides on a boundary of the cell 25a, then a hashing or other algorithm may determine at block 38 based on information from the personality communication the identity/location of the node's adjacent face node 12b.

The face node 12a may then send at block 40 a packet to the determined adjacent node 12b. The face node 12a may subsequently receive at block 42 from the adjacent face node 12b a response, such as a success signal. Where alternatively no communication from the adjacent face node 12b is received at block 42, an error may be logged at block 44. The absence of a return communication from the adjacent face node 12b may indicate a faulty connection between the adjacent face nodes 12a, 12b. If more links and nodes need to be tested at block 45, then the sequence may continue at block 40. The test may otherwise conclude at block 47.

An error may also be logged at block 48 if the performance of the communication from the adjacent face node 12b to the face node 12a fails to conform to a desired latency at block 46. Latency generally regards the time it takes the packet to arrive at its destination. Similarly, an error may be logged if the performance of the communication fails to conform at block 48 with a desired bandwidth, or rate of data transmission. If the performance conditions are met at blocks 46 and 48, then the face node 12a may continue with another face verification cycle at block 40 of FIG. 4.

Figure 5:
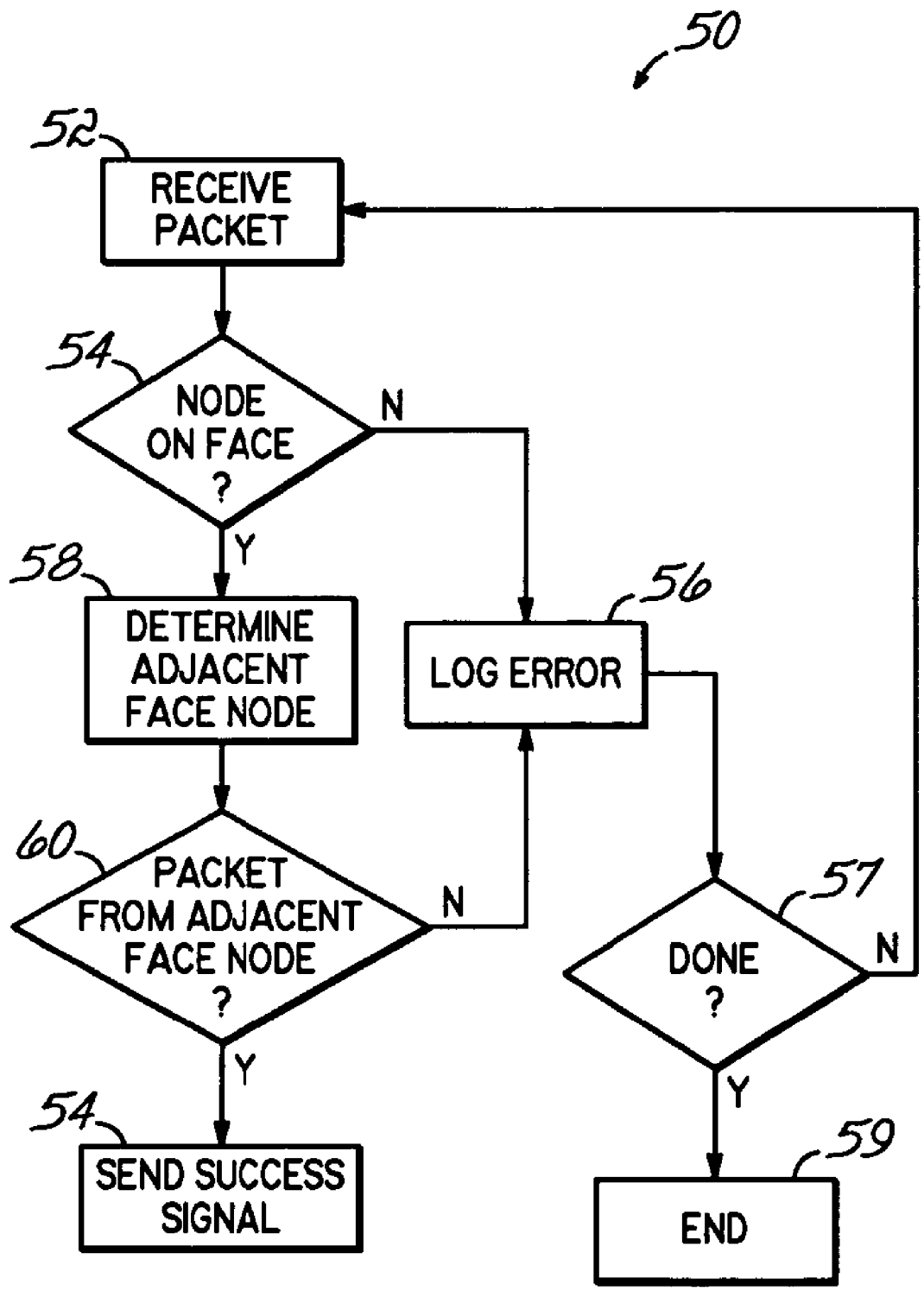
FIG. 5 is a flowchart having a set of exemplary steps executable by the system of FIG. 1 for conducting a cell surface node integrity check from the perspective of a surface node adjacent to the surface node of FIG. 4.

FIG. 5 is a flowchart 50 having a set of exemplary steps executable by the system 28 of FIG. 1 for conducting a cell surface node integrity check from the perspective of a surface node 12b adjacent to the surface node 12a of FIG. 4. At block 52, the node may receive a packet from surface node 12a. As discussed herein, a packet may comprise any data transmission, typically ranging in size from 32 bytes to 256 bytes.

The processes of the flowchart 50 may presume that the node 12b has already received the personality communication. Consequently, the node 12b may determine at block 54 if it is located on a cell boundary, i.e., the cell has a "0" coordinate value. If not, then the node has receive the packet from the surface node 12a in error, and this abnormality is logged at block 56. If however, the node 12b is located on a face of the cell 25b at block 54, then the node 12b may determine at block 58 and 60 if the packet was received from an adjacent face node 12a. If so, then the node 12b may generate a success a signal at block 62 for delivery to the adjacent, initiating node 12a. Otherwise, an error may be logged at block 56 to initiate service of a potentially faulty nodal connection. If more links and nodes need to be tested at block 57, then the sequence may continue at block 52. The testing processes may otherwise conclude at block 59.

While the present invention has been illustrated by a description of various embodiments and while these embodiments have been described in considerable detail, it is not the intention of the applicants to restrict, or in any way limit, the scope of the appended claims to such detail. For instance, any of the steps of the above exemplary flowcharts may be deleted, augmented, made to be simultaneous with another or be otherwise altered in accordance with the principles of the present invention. Additional advantages and modifications will readily appear to those skilled in the art.

One skilled in the art will further appreciate that while the processes of the present invention may provide particular advantages within the context of parallel processing systems, the principles of the invention further may apply to many other applications, to include most nodal fault detection operations. Furthermore, while cells discussed herein are described generally in the context of midplanes, one skilled in the art will appreciate that a midplane is just one type of cell in accordance with the principles of the present invention.

Moreover, while a cell comprises a grouping of nodes as discussed herein, a cell more particularly includes a grouping of nodes that communicates more quickly with each other than with other nodes. For instance, intra-cell communications generally require less cabling and associated routing processes. Furthermore, while the midplane cell of FIG. 3 shows a cubical structure, one skilled in the art will appreciate that cells may take on additional symmetric and asymmetric shapes, including those having more or less than six faces. Relatedly, while the torus network is a three dimensional network, networks and associated hardware/software may implicate fewer or more dimensions. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method or detecting a nodal fault in a computing system having a plurality of cells, wherein a first cell of the plurality of cells includes a plurality of nodes and at least one of the nodes comprises part of a first boundary surface of the first cell and is configured for connecting to a second node of a second boundary surface, the method comprising:

causing the first node of the first boundary surface to communicate with the second node on the second boundary surface; and determining using the communication the nodal fault relating to at least one of the first and second nodes.

2. The method of claim 1, further comprising determining if the first node is located on the first boundary surface.

3. The method of claim 1, further comprising determining if the second node is adjacent to the first node.

4. The method of claim 3, further comprising signaling an error if the second node is not adjacent.

5. The method of claim 1, further comprising causing a third node on the first boundary to concurrently communicate with a fourth node on the second boundary.

6. The method of claim 1, wherein causing the first node of the first boundary surface to communicate with the second node on the second boundary surface further comprises causing the first node to communicate with a node on the same cell.

7. The method of claim 1, wherein causing the first node of the first boundary surface to communicate with the second node on the second boundary surface further comprises causing the first node to communicate with a node on a second cell.

8. The method of claim 1, further comprising servicing the nodal fault.

9. The method of claim 1, wherein determining the nodal fault includes determining a fault associated with at least one of software, a connection, and another hardware component.

10. The method of claim 1, wherein determining the nodal fault includes determining a latency associated with a nodal communication.

11. The method of claim 1, wherein determining the nodal fault includes determining a bandwidth associated with a nodal communication.

12. The method of claim 1, further comprising storing an indication of the nodal fault.

13. The method of claim 1, further comprising generating a status signal indicative of the communication between the first and second nodes.

* * * * *